United States Patent [19]

Minayoshi et al.

[11] Patent Number: 5,085,800
[45] Date of Patent: Feb. 4, 1992

[54] GLYCOL DISPERSION OF PRECIPITATED CALCIUM CARBONATE

[75] Inventors: Shiro Minayoshi; Naofumi Saitoh; Toshio Higashi; Noritsugu Ebisuya, all of Akashi, Japan

[73] Assignee: Maruo Calcium Company, Limited, Akashi, Japan

[21] Appl. No.: 634,962

[22] Filed: Jan. 2, 1991

Related U.S. Application Data

[63] Continuation of Ser. No. 215,489, Jul. 6, 1988, abandoned.

[51] Int. Cl.$^5$ .............................................. B01J 13/00
[52] U.S. Cl. ...................................... 252/309; 524/425
[58] Field of Search ............................ 252/309, 315.2; 524/425; 106/423, 464, 465

[56] References Cited

U.S. PATENT DOCUMENTS

| 4,693,932 | 9/1987 | Kuze et al. | 524/425 X |
| 4,727,108 | 2/1988 | Kagiyama et al. | 524/425 |
| 4,898,620 | 2/1990 | Rayfield et al. | 106/464 |

FOREIGN PATENT DOCUMENTS 62-195051  8/1987  Japan.
62/232431 10/1987 Japan .................................. 524/425

OTHER PUBLICATIONS

Derwent Abstract, An 86-194139/30.
Derwent Abstract, AN 86-262016/40.

*Primary Examiner*—Richard D. Lovering
*Assistant Examiner*—Daniel S. Metzmaier
*Attorney, Agent, or Firm*—Armstron, Nikaido, Marmelstein, Kubovcik & Murray

[57] ABSTRACT

The present invention provides a glycol dispersion comprising calcium carbonate and glycol prepared by wet-grinding under the specified conditions a glycol slurry composed of glycol and calcium carbonate satisfying the specified dispersibility and particle size. The glycol dispersion of the present invention is good in dispersion stability in glycol and is capable of improving running property of audio tapes, video tapes, etc., thus contributing to improvement in properties such as sound and image.

3 Claims, 8 Drawing Sheets

WET-GRINDING

WET-GRINDING

WET-GRINDING

WET-GRINDING

GLYCOL DISPERSION OF PRECIPITATED CALCIUM CARBONATE

This application is a continuation of application Ser. No. 07/215,489 filed July 6, 1988 now abandoned.

BACKGROUND OF THE INVENTION

1. Field of the Invention

The present invention relates to a glycol dispersion of precipitated calcium carbonate. More particularly, it relates to a dispersion in glycol such as ethylene glycol of precipitated calcium carbonate for use as a material in the manufacture of polyester which is used as material especially for films or fibers, for the purpose of improving the polyester's friction coefficient, wherein the glycol dispersion of precipitated calcium carbonate comprises a grade of calcium carbonate having a good dispersibility in glycol and a good uniformity of the particle size and glycol such as ethylene glycol, propylene glycol and butylene glycol.

2. Description of the Prior Art

Polyester manufactured today commercially, polyethylene terephthalate (hereinafter called "PET") in particular, has excellent physical and chemical properties, and is being widely used for the manufacture of fibers, films and other moldings.

Meanwhile, however, it is known that it lacks in sliding property in the process of molding, further processing and handling of manufactured articles, this interferes with the workability and results in lowering the commercial values of the products. And, these troubles are mostly attributable to the high frictional coefficient of polyester itself. To overcome such problems, there have been proposed to date many methods which essentially consist in incorporating fine particles in polyester and imparting a proper degree of roughness to the surface of a molded article to thereby improve the surface sliding property thereof. As such fine particles, it is well-known to use fine particles of inorganic compounds insoluble in and inert to polyester such as titanium dioxide, silica, talc, kaolin and calcium carbonate added to the polymerization step in the form of a glycol slurry for the purpose of improving dispersibility thereof in polymer.

However, it is also known that these inorganic particles are generally insufficient in the affinity with glycol or polyester which leads to a defect of agglomerating in the slurry or during the polymerization. The presence of agglomerated coarse particles in polyester can cause yarn breakage in the spinning process, formation of the so-called "fish eye" et cetera and, in particular, drop-out or lowering of S/N ratio when it is used for manufacture of film for magnetic tape, and there has been a strong need for development of fine particles free from formation of coarse particles.

Among the fine particles used in polyester, calcium carbonate is widely used as filler in various fields such as paper, paints, rubbers and plastics. The calcium carbonates are roughly classified into two types in general, namely ground calcium carbonate and precipitated calcium carbonate (synthetic calcium carbonate).

The ground calcium carbonate is manufactured by mechanically pulverizing limestone and by subsequently classifying the resulting powder into various grades. This has an advantage of being relatively low in manufacturing cost, but has defects of being broad in particle size distribution and a powder fineness beyond a certain limit being unattainable by the present level of pulverizing and classifying technique.

The ground calcium carbonate is frequently used in polyester because of its affinity with polyester is better than other fine particles and it has hitherto been used in the following manners;

(1) A method wherein a commercially available grade of ground calcium carbonate or ground calcium carbonate was surface-treated with fatty acid, resin acid or alkali metal salts thereof, air classified repeatedly for elimination of coarse particles not less than 5 μm in particle size, and then dispersed in glycol.

(2) A method wherein a commercially available grade of ground calcium carbonte was dispersed in glycol and then, after being subjected to wet-grinding by a wet-grinder such as sand mill, it is wet-classified for elimination of coarse particles not less than approximately 3 μm in particle size.

The use of the ground calcium carbonate, notwithstanding, prepared by the processes as mentioned above in polyester involves the following drawbacks;

In case of (1);

(a) Even if a particularly fine grade of commercially available ground calcium carbonate is chosen and air classified, its particle size distribution before classification is very broad, having coarse particles of approximately 4-6 μm in size contained therein as shown in FIG. 8. Even if a commercially available air classifier of the highest performance is used and classification is done repeatedly, it is difficult to perfectly eliminate coarse particles up to 3 μm in size. For this reason, it is difficult to use the ground calcium carbonate prepared by this process in extremely thin polyester film for use in audio tapes, etc. An electron microscopic picture (×1,000) of a particularly fine grade of commercially available ground calcium carbonate (Super #2300, manufactured by Maruo Calcium Co., Ltd) is shown in FIG. 8.

(b) When ground calcium carbonate is surface-treated with fatty acid, resin acid or an alkali metal salt thereof for improving air classification efficiency, dispersion stability in glycol is adversely affected due to poor compatibility between such surface-treating agents and glycol.

(c) Since there is a limit to the fineness of commercially available grades of ground calcium carbonate, preparation of calcium carbonate of the desired particle size is impossible even by most elaborate air classification.

In case of (2);

(a) Since ground calcium carbonate as material is attritionally ground by the use of a wet-type grinder, it is relatively easy to obtain calcium carbonate of the desired average particle size compared with any of the methods described above under (1) but, since the mode of grinding is attritional, an increased amount of particles of unnecessary fineness results to broaden the particle size distribution. This means undesirable decrease of the absolute quantity of calcium carbonate contributing to improvement of frictional properties of polyester, which is a major object of the present invention, and, worse, such ultrafine particles tend to reagglomerate in glycol to form coarse secondary particles, thus possibly deteriorating the physical properties of polyester films or polyester fibers.

(b) Even when wet-grinding is performed with ground calcium carbonate, it is possible that part of the coarse particles, 4-6 μm in size, contained in the material ground calcium carbonate remain in the calcium carbonate after grinding due to a phenomenon called "short pass" (a phenomenon wherein coarse particles in the material to be ground are discharged from a wet-type grinder substantially unground) and even if an attempt is made to eliminate such coarse particles by the use of a wet-type centrifugal classifier, the size of particles which can be eliminated in an economically acceptable manner is only reduced to approximately 1 μm. Accordingly, the ground calcium carbonate prepared in such processes as aforesaid is not applied to a field where the perfect removal of the coarse particles exceeding 1 μm is necessary like an 8 mm video tape.

For the foregoing reasons, when calcium carbonate prepared by a commercially available ground calcium carbonate is applied to polyester, it is difficult to improve the slidability of a polyester film or fiber more than the present level. And the improvement of this slidability influences running stability of audio tapes etc., and the running stability influences delicate sound properties required of such high grade tape. Hence calcium carbonate satisfying the following properties is urgently required by polyester makers, electric machine makers and the like, but to date calcium carbonate having such properties, as listed below, which would satisfy the need of the industry has not yet been proposed;

(i) calcium carbonate excellent in dispersion stability in glycol,
(ii) calcium carbonate uniform in particle size,
(iii) calcium carbonate not containing unnecessary particles such as coarse or ultrafine particles and being sharp in particle size distribution in glycol,
(iv) calcium carbonate whose size is freely selectable.

SUMMARY OF THE INVENTION

It is a primary object of the present invention to provide a glycol dispersion of calcium carbonate having a good dispersion stability in glycol.

Another object of the present invention is to provide a glycol dispersion of calcium carbonate not containing unnecessary coarse or ultrafine particles, being uniform in particle size, having a well defined or sharp particle size distribution and having its particle size freely selectable.

Further objects and advantages of the present invention will become apparent for those skilled in the art from the detailed description and explanation given below.

After extensive and intensive studies in order to attain the aforementioned objects, the present inventors have discovered that a grade of calcium carbonate imparting good properties to polyester can be obtained by wet grinding in glycol under the specified conditions precipitated calcium carbonate having the specified dispersibility and particle size and thus completed the present invention.

DETAILED DESCRIPTION OF THE INVENTION

Figure 1:
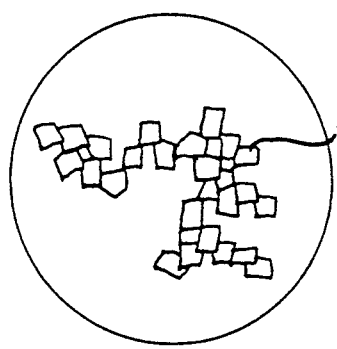
FIGS. 1 and 2 are schematic views showing the method of wet-grinding precipitated calcium carbonate.

The present invention provides a glycol dispersion of precipitated calcium carbonate comprising glycol and precipitated calcium carbonate obtained by mixing with glycol precipitated calcium carbonate satisfying the requirements described below under (a) and (b) to form a glycol slurry and then wet-grinding it under conditions satisfying the requirements described below under (c).

(a) The primary particle size $D_1$ calculated by the following formula (1) from the specific surface area $S_1$ measured by the BET method shall be not less than 0.1 μm.

$$Dx = 60,000/2.7Sx \quad (1)$$

Where:
$Dx$ = the average particle size (μm) of precipitated calcium carbonate calculated from the specific surface area measured by the BET method.
$Sx$ = the specific surface area (cm$^2$/g) of precipitated calcium carbonate measured by the BET method.

(b) The ratio $R_1$ of the 50% weight average particle size $d_1$ of the particle size distribution measured in an aqueous system by the use of Light Transmission Centrifugal Precipitation-type Particle Size Distribution Measuring Device SA-CP-2 (manufactured by Shimazu Seisakusho Ltd.) to the above-mentioned value $D_1$ shall satisfy the following formula (2).

$$R_1 = d_1/D_1 \leq 7 \quad (2)$$

(c) The ratio $R_2$ of the above-mentioned primary particle size $D_1$ to the primary particle size $D_2$ calculated by the above-mentioned formula (1) from the specific surface area $S_2$ of precipitated calcium carbonate measured by the BET method shall satisfy the following formula (3)

$$R_2 = D_1/D_2, 1 < R_2 \leq 10 \quad (3)$$

A first feature of the present invention consists in that as material to be wet-ground is used precipitated calcium carbonate of specific range of particle size and dispersibility. Using precipitated calcium carbonate of a specific dispersibility and range of particle size as material for grinding has the following advantages compared with the use of ground calcium carbonate therefor;

The schematic views of the shapes of particles before and after grinding when precipitated calcium carbonate and ground calcium carbonate are used as material to be wet-ground respectively are shown in FIGS. 1, 2, 3 and 4.

Figure 2:
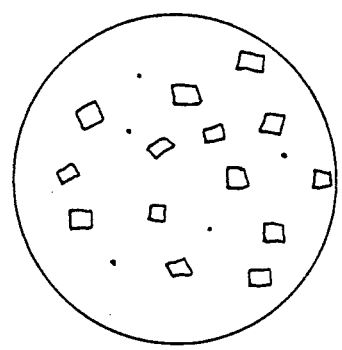
Figure 3:
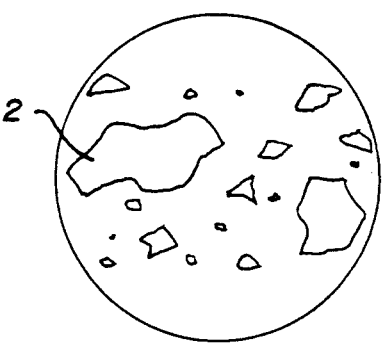
FIGS. 3 and 4 are further schematic views showing the method of wet-grinding ground calcium carbonate.
Figure 4:
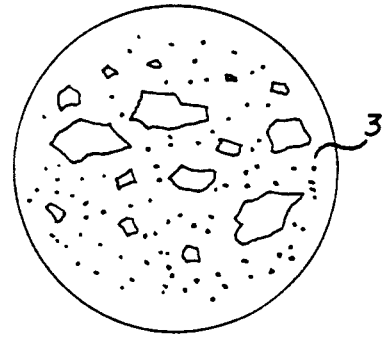

As shown in FIG. 1, when precipitated calcium carbonate of more than a given dispersibility is used, the grinding energy applied to the calcium carbonate particles in the wet-grinding process is first consumed for breaking and dispersing the agglomeration of the primary particles of weak bonding power since the presipitated calcium carbonate is in the form of soft agglomerates of primary particles (1) substantially uniform in particle size and, unless too powerful wet grinding is continued for a too long time, there is little risk of the individual primary particles (1) being broken or unnecessary ultrafine particles being formed. As a result, as shown in FIG. 2, calcium carbonate uniform in particle size and well defined sharp in particle size distribution as shown in FIG. 2 is obtainable. In contrast thereto, when ground calcium carbonate is used as material to be ground, as shown in FIGS. 3 and 4, the grinding energy applied to calcium carbonate particles in the wet grinding process is partly used for disintegrating and grinding them into coarse primary particles made up of more than one coarse primary particle (2), but since breaking and grinding of the coarse primary particles require quite a lot of grinding energy, it is likely that the grinding energy applied is consumed for superficially grinding the coarse primary particles (2) to give rise to a large amount of unnecessarily fine particles (3).

As is apparent from the above, the use of precipitated calcium carbonate of a specific range of particle size and a specific degree of dispersion allows preparation of calcium carbonate particles substantially uniform in particle size and well defined or sharp particle size distribution compared with the use of ground calcium carbonate.

According to the present invention, the primary particle size of precipitated calcium carbonate used as material to be wet-ground may be acceptable if the diameter $D_1$ of its primary particle calculated by the following formula (1) from the specific surface area $S_1$ measured by the BET method is not less than 0.1 μm.

$$Dx = 60,000/2.7Sx \qquad (1)$$

Where:

$Dx$ = Average particle size (μm) of precipitated calcium carbonate calculated from the specific surface area measured by the BET method: and $Sx$ = Specific surface area (cm$^2$/g) of precipitated calcium carbonate measured by the BET method.

When the diameter of the primary particle of precipitated calcium carbonate used as material to be wet-ground is less than 0.1 μm, larger secondary particles (each being an agglomerate of the primary particles) due to the increased agglomerating potential between the primary particles, and these secondary particles are difficult to disintegrate and redisperse even by economically acceptable repeated grinding.

As to the degree of dispersion of precipitated calcium carbonate to be used as material to be ground, the ratio $R_1$ of the 50% weight average particle size $d_1$ for the particle size distribution measured in an aqueous system by the use of Light Transmission Centrifugal Precipitation-type Particle Size Distribution Measuring Device to the diameter of the primary particle $D_1$ calculated from the specific surface area $S_1$ measured of precipitated calcium carbonate by the BET method may be acceptable if $R_1 = d_1/D_1$, $R_1 \leq 7$, preferably $R_1 \leq 4$. If a grade of precipitaed calcium carbonate, whose $R_1$ is in excess of 7, is used as material to be wet-ground, such precipitated calcium carbonate is composed of large and firmly agglomerated secondary particles, hence the secondary particles cannot be easily disintegrated and redispersed in the process of wet-grinding and as in the case where ground calcium carbonate is used as material to be wet-ground, the ground matter is a mixture comprising both coarse secondary particles and unnecessarily finely ground ultra-fine particles, and thus the object of the present invention cannot be attained.

A second feature of the present invention consists in specific conditions for the process of wet-grinding precipitated calcium carbonate.

Namely, the specific wet-grinding conditions according to the present invention are such that the ratio $R_2$ of the primary particle size $D_1$ to $D_2$ calculated by the above-mentioned formula (1) from the specific surface areas of the precipitated calcium carbonate before and after wet-grinding is:

$$R_2 = D_1/D_2, 1 < R_2 \leq 10$$

Figure 5:
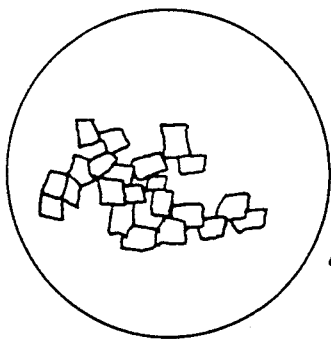
FIGS. 5 and 6 show precipitated calcium carbonate of the present invention obtained by wet-grinding.
Figure 6:
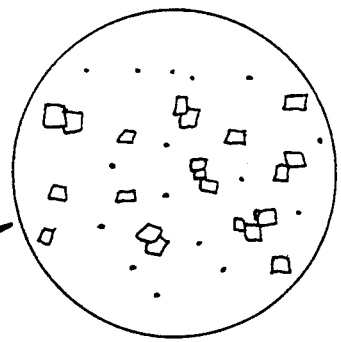

Where:

$D_2$ = The diameter (μm) of primary particles of wet-ground precipitated calcium carbonate calculated from the specific surface area $S_2$ measured by the BET method (FIGS. 5 and 6).

Figure 7:
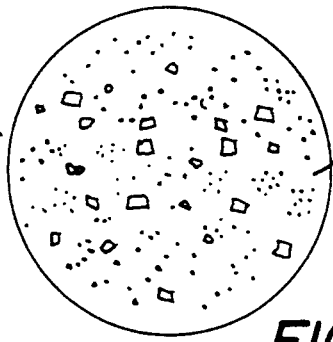
FIG. 7 shows precipitated calcium carbonate of $R_2 > 10$.
Figure 8:
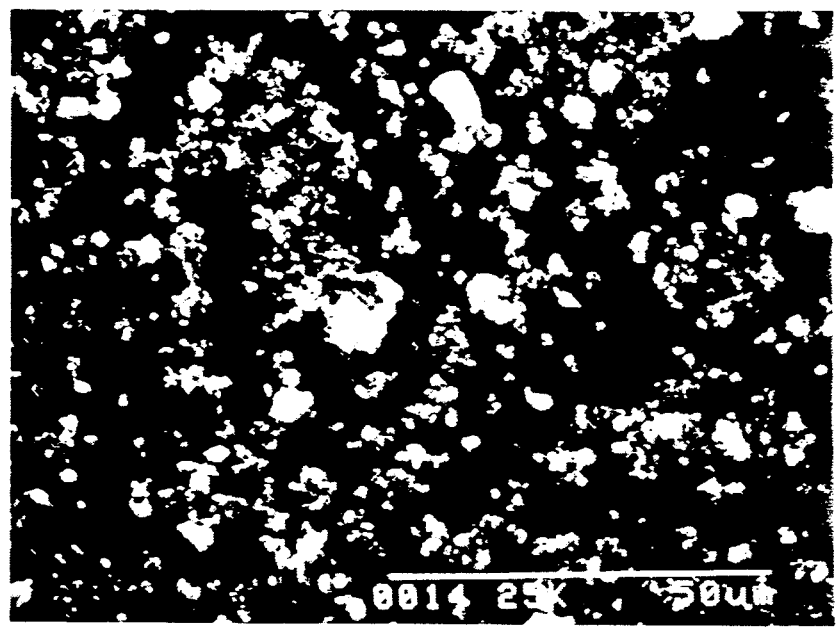
FIGS. 8 through 20 are electron microscopic pictures showing the particle structure of calcium carbonate.

In contrast thereto, when the grinding conditions are so set that $R_2$ is in excess of 10, excessive grinding may result in marked attrition of the surface of the primary particles and in an unfavorable phenomenon of formation of an increased amount of unnecessary ultrafine particles (3) (FIGS. 5 and 7).

Hence, calcium carbonate not containing a large amount of unnecessary ultrafine particles can be obtained by means of wet grinding under the specific conditions of the present invention.

Calcium carbonate prepared by the present invention, that is, calcium carbonate prepared to have combined therein the aforesaid two features will also satisfy the properties sought after by polyester manufacturers, manufacturers of electric machines and appliances et al.

Glycols used in the present invention include ethylene glycol, propylene glycol, butylene glycol and the like.

Precipitated calcium carbonate used as material wet-ground in the present invention is a synthetic calcium carbonate prepared by chemical processes such as the so-called carbon dioxide process in which milk of lime made through reaction of quick lime obtained by calcining limestone with water, and then passing carbon dioxide generated from calcination of limestone through the milk of lime, the limesoda process in which sodium carbonate is caused to react with milk of lime and the soda process in which sodium carbonate is caused to react with calcium chloride, and there is no particular limitation with respect to such manufacturing process, but it is apparent that the carbonation method or manufacturing method is required to be such that the precipitated calcium carbonate satisfies the aforesaid two requirements of $0.1 \leq D_1$, $R_1 \leq 7$.

For instance, in manufacturing precipitated calcium carbonate as wet-grinding material by the carbon dioxide process, the following methods may be proposed but this naturally means no limitation.

(1) A method of preparing an aqueous suspension of precipitated calcium carbonate in extremely fine powder form with a particle size of less than 0.1 μm in a usual manner, converting it into an equivalent aqueous dispersion through proper pH control, passing carbon dioxide through or dripping primarily carbonated milk of lime (milk of lime partially carbonated in advance) into the aqueous dispersion of precipitated calcium carbonate in extremely fine powder form so that the pH of the system is controlled to be within the specified range, and thus causing the particles to grow with the calcium carbonate in extremely fine powder form as nuclei (Japanese Patent Examined Publication No. 43331/83), or like method.

(2) The method described above under (1) with the primarily carbonated milk of lime substituted with milk of lime, or like method.

(3) A method of spraying milk of lime in an atmosphere of carbon dioxide under specific conditions for carbonation reaction to proceed, an aqueous suspension of calcium carbonate in extremely fine powder form with a particle size of less than 1 μm and, after adding milk of lime to the aqueous suspension of calcium carbonate in extremely fine powder form at a fixed rate, the resulting mixture is resprayed into the atmosphere of carbon dioxide and this procedure is repeated for particles to grow progressively with calcium carbonate in extremely fine powder form as nuclei (Japanese Patent Examined Publication No. 28397/79), or like method.

(4) A method of manufacturing precipitated calcium carbonate by passing carbon dioxide through milk of lime, wherein a strontium or barium salt is used in the carbonation process (Japanese Patne Non-examined Publication No. 69425/84).

(5) A method of stirring an aqueous suspension of precipitated calcium carbonate prepared in a usual manner and having its pH controlled within a specific range to thereby improve the degree of dispersion of the precipitated calcium carbonate.

The wet-type grinder used for wet grinding in the process of the present invention is a device for grinding the dispersion of the material to be treated under reflux or being passed therethrough under mechanical stirring by means of discs, bars, screw or the like with natural or synthetic minute particles of mineral sand, minute particles of hard glass, hard plastic, metal or the like filled as media in the vessel of the device such as attritor, Dyno-mill and universal mill. The average diameter of the aforesaid minute particles used in wet-type grinders may preferably be not more than approximately 5 mm, more preferably not more than approximately 3 mm.

In wet-grinding precipitated calcium carbonate, the following two methods are used;

(1) An aqueous suspension of precipitated calcium carbonate having the desired particle size is prepared by a carbon dioxide process in which carbon dioxide is passed through an aqueous calcium hydroxide solution or by a solution process in which a calcium chloride solution and a sodium carbonate solution are mixed to cause reaction, dehydrated by the use of a filter such as filter press, dried by the use of a dryer such as attritor and paddle dryer, thereafter being subjected to pulverization to give precipitated calcium carbonate powder. Then, said powder is mixed with glycol to obtain a glycol suspension of precipitated calcium carbonate and the glycol suspension is wet-ground and uniformly dispersed by the use of a wet-grinder to prepare a glycol suspension of the present invention.

(2) An aqueous suspension of precipitated calcium carbonate having the desired particle size by the carbon dioxide process or solution process and dehydrated by the use of a filter such as filter press to obtain a press cake, then to the press cake is added a small quantity of a dispersing agent such as alkali metal salt or ammonium salt of polycarboxylic acid and stirred vigorously to prepare a highly concentrated aqueous slurry of the precipitated calcium carbonate. The highly concentrated aqueous slurry is then wet-ground and classified by the use of the wet-grinder as aforesaid, dried by a slurry dryer such as spray dryer and paddle dryer, then subjected to pulverization, as necessary, to provide precipitated calcium carbonate powder. The obtained powder is mixed with glycol to give a glycol suspension of the precipitated calcium carbonate and the resulting suspension is subjected to grinding and dispersing by the use of the wet-grinder as mentioned above to obtain a glycol suspension of precipitated calcium carbonate.

The objects of the present invention are attainable by either of the above (1) or (2). As to the solid concentration of precipitated calcium carbonate in such glycol suspension, there is no particular limitation but it is considered desirous to be not less than 20 weight % and not more than 80 weight % with cost, grinding efficiency and viscosity of glycol suspension or the like taken into consideration.

According to the present invention, the primary particle size of precipitated calcium carbonate calculated from the specific surface area measured by the BET method is meant the primary particle size of precipitated calcium carbonate not yet wet-ground regardless of the suspending or dispersing medium such as water or glycol, that is, of the precipitated calcium carbonate in powder form obtained by drying an aqueous suspension of precipitated calcium carbonate made by carbonation by, for instance, the carbon dioxide process or the solution processes such as the lime soda process and soda process. The 50% weight average particle size $d_1$ measured by the Light Transmission Centrifugal Precipitation-Type Particle Size Distribution Measuring Device was determined as follow.

Measuring Device: SA-CP-2 (manufactured by Shimazu Seisakusho Ltd.)
Measuring method:
Solvent: 0.2% aqueous solution of sodium hexamethalate
Preliminary dispersion: Shaking for 10 minutes by KM Shaker Model V-5 (manufactured by Iwaki Co., Ltd.)
Speed of particle size measuring device: 1,200 rpm.
Height of liquid level: 1 cm above bottom of the cell
Measuring temperature: 25° C.
Measuring method: Calculation to be made by the following formula

| Result of particle size distribution measurement (Example) | |
| --- | --- |
| Particle size (μm) | Cumulative part. size distrib. (%) |
| –6 | 0.6 |
| 6–5 | 1.0 |
| 5–4 | 1.9 |
| 4–3 | 2.9 |
| 3–2 | 7.3 |
| 2–1 | 22.1 |
| 1–0.8 | 38.9 |
| 0.8–0.6 | 62.4 |
| 0.6–0.5 | 73.7 |
| 0.5–0.4 | 84.5 |
| 0.4–0.3 | 100.0 |
| 0.3–0.2 | — |
| 0.2– | — |

0.6 μm + [(62.4%−50%)/(62.4%−38.9%)] × (0.8 μm−0.6 μm) = 0.706 μm

Hence, the 50% weight average particle size for the above particle size distribution is assumed to be 0.706 μm.

The present invention is described below in greater detail and more concretely, with examples and control examples but, needless to say, these examples are not meant to limit the scope of the invention.

The grades of precipitated calcium carbonate used in examples and control examples are as described below.
Precipitated calcium carbonate A:

$CO_2$ gas was passed through 7.2 m³ of milk of lime, 15° C. and 1.07 in specific gravity at a rate of 20 m³/minute until completion of carbonation. Then, the system's temperature was adjusted to 50°±5° C. and its pH to 10±0.5 by the use of the $CO_2$ gas and milk of lime and after subsequent stirring for 24 hours a viscous aqueous dispersion of the precipitated calcium carbonate A was obtained. The specific surface area measured by the BET method and the particle size distribution thereof are shown in Table 1.

Precipitated calcium carbonate B:

To 4 m³ of an aqueous dispersion of the precipitated calcium carbonate A with its temperature adjusted to 50° C.±5° C., milk of lime with 1.07 in specific gravity was dripped at a rate of 0.6 m³/hour with simultaneous passing of $CO_2$ gas through the system for carbonation to proceed with the system's pH kept at 10±0.5 under stirring. Dripping of milk of lime was terminated when the total amount added reached 32 m³, $CO_2$ gas was passed through the system until its pH reached 7.0 and thus an aqueous dispersion of the precipitated calcium carbonate B was obtained. The specific surface area measured by the BET method and the particle size distribution thereof are shown in Table 1.

Precipitated calcium carbonate C:

Milk of lime with the specific gravity of 1.07 was dripped into 3 m³ of an aqueous dispersion of precipitated calcium carbonate A (solid concentration 14.9%), whose temperature was adjusted to 50° C.±5° C., at a rate of 0.6 m³/hour with simultaneous passing of $CO_2$ gas therethrough for carbonation to proceed under stirring with the system's pH kept at 10±0.5. When the total amount of the milk of lime added reached 60 m³, its dripping was terminated with the $CO_2$ gas passage continued until the system's pH reached 7.0, and thus an aqueous dispersion of the precipitated calcium carbonate C was obtained. The specific surface area measured by the BET method and the particle size distribution thereof are shown in Table 1.

Precipitated calcium carbonate D:

To 43 m³ of milk of lime, at 30° C. with the specific gravity of 1.08, 12 kg of strontium carbonate were added the $CO_2$ gas was passed therethrough at a rate of 5 m³/minute under stirring for carbonation to proceed and the reaction was terminated when the system's pH reached 8.0. Then, with the system's temperature kept at 60° C.±5° C. stirring was continued for the alkali residues to be eluated and by partial use of the $CO_2$ gas the system's pH was adjusted to 10±1 and after stirring for 24 hours it was lowered to 7.0 using the $CO_2$ gas, and thus an aqueous dispersion of the precipitated calcium carbonate D was obtained. The specific surface area measured by the BET method and the particle size distribution of thereof are shown in Table 1.

Precipitated calcium carbonate E:

$CO_2$ gas was passed through 7.2 m³ of milk of lime, 30° C. and 1.08 in specific gravity at a rate of 2 m³/minute for carbonation to proceed and it was terminated when the system's pH reached 6.8, and thus an aqueous dispersion of the precipitated calcium carbonate E was obtained. The specific surface area measured by the BET method and the particle size distribution of thereof are shown in Table 1.

TABLE 1

| | Precipitated calcium carbonate | | | | |
|---|---|---|---|---|---|
| | A | B | C | D | E |
| Specific surface area | 340,000 | 28,500 | 14,200 | 48,600 | 55,000 |
| $S_1$ by BET method (cm²/g) | | | | | |
| $D_1$ calculated from $S_1$ (μm) | 0.065 | 0.78 | 1.56 | 0.46 | 0.40 |
| Cumulative particle size distribution (%) by SA-CP-2 | | | | | |
| ~6 (μm) | 0 | 0 | 1.8 | 0.3 | 7.7 |
| 6~5 | 0 | 1.1 | 4.7 | 0.9 | 14.8 |
| 5~4 | 0.9 | 2.2 | 7.3 | 1.5 | 26.8 |
| 4~3 | 2.0 | 4.1 | 13.3 | 2.2 | 54.9 |
| 3~2 | 4.1 | 8.7 | 31.8 | 4.1 | 90.9 |
| 2~1 | 9.9 | 40.5 | 75.3 | 14.3 | 100.0 |
| 1~0.8 | 13.6 | 59.6 | 83.7 | 22.2 | |
| 0.8~0.6 | 22.3 | 76.2 | | 37.9 | |
| 0.6~0.5 | 31.2 | 83.9 | | 49.2 | |
| 0.5~0.4 | 47.6 | 100.0 | | 64.5 | |
| 0.4~0.3 | 72.2 | | | 79.9 | |
| 0.3~0.2 | 92.6 | | | 89.3 | |
| 0.2~ | 100.0 | | | 100.0 | |
| 50% average diameter of particle size distribution $d_1$ (μm) | 0.39 | 0.90 | 1.58 | 0.59 | 3.17 |
| $R_1 \left( = \dfrac{d_1}{D_1} \right)$ | 6.0 | 1.15 | 1.01 | 1.28 | 7.93 |

EXAMPLE 1

A press cake obtained by dehydrating the precipitated calcium carbonate B (an aqueous dispersion thereof with a solid concentration of 14.9%) by the use of a filter press was pulverized after drying by a paddle dryer, and thus 50 kg of the precipitated calcium carbonate B was obtained.

Figure 9:
Figure 10:
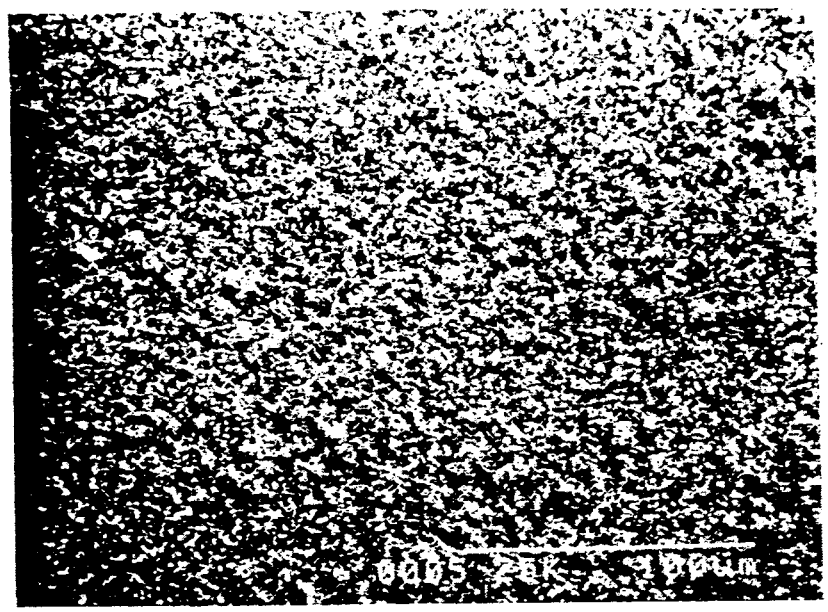

50 kg of this calcium carbonate powder B was poured into 50 kg of ethylene glycol (Fiber Grade A of Mitsubishi Petrochemical Co., Ltd.) to prepare an ethylene glycol slurry as material to be wet-ground, this slurry was passed through a wet-grinder (Dynomill Pilot-type of WAB Ltd., media: glass beads 0.6–0.9 mm ɸ, media charging rate 80%, running speed 1,500 rpm.) at a rate of 120 ml/min for wet grinding and an ethylene glycol dispersion of the precipitated calcium B was thus prepared. The results of measurement taken of the particle size distribution by the use of SA-CP-2 and the 50% weight average diameter $d_2$, $S_2$, $D_2$ and $R_2$ calculated from the measured particle size distribution are shown in Table 2. An electron microscopic picture taken of the aforesaid dispersion is shown in FIG. 9 (×5,000) and in FIG. 10 (×400). As seen from the Table 2, FIG. 9 and FIG. 10, the ethylene glycol dispersion of the precipitated calcium carbonate B is relatively uniform in particle size, its particle size unnecessarily fine particles is small and thus the particle size distribution is well defined or sharp as compared with Control examples as will be described later and it was confirmed that there was no presence of coarse particle i.e. 2–3 μm in size.

EXAMPLE 2

Figure 11:
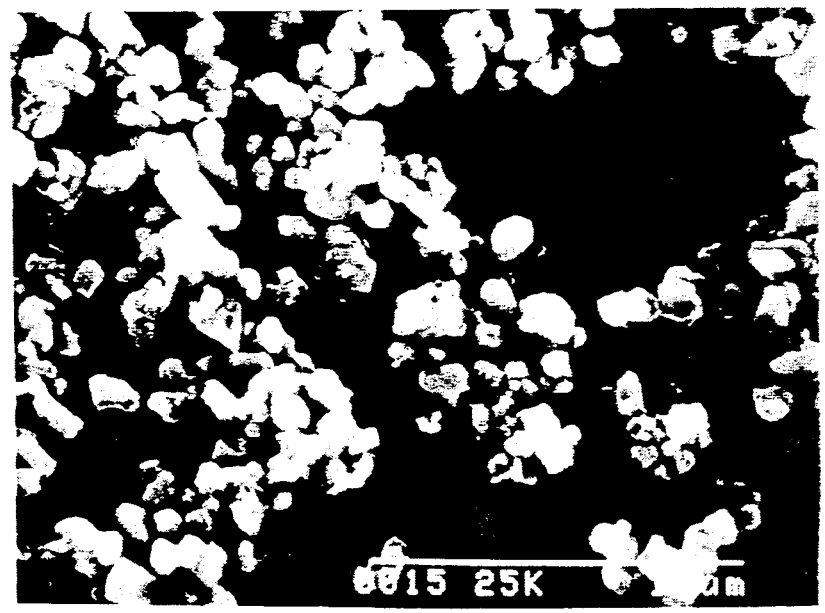

An ethylene glycol dispersion of the precipitated calcium carbonate C (solid concentration: 14.9%) was prepared in the same manner as described above under Example 1. The results of measurement of particle size distribution of this dispersion by the use of SA-CP-2, namely $d_2$, $S_2$, $D_2$ and $R_2$, are shown in Table 2. An electron microscopic picture ($\times 5,000$) of this ethylene glycol dispersion is shown in FIG. 11.

EXAMPLE 3

An aqueous dispersion of the precipitated calcium carbonate D (solid concentration: 16.8%) was dehydrated by the use of a filter press, and to this press cake 0.2% weight % of sodium salt of polyacrylic acid (as 100% pure) on solid content of the calcium carbonate and by subsequent intensive stirring a concentrated slurry of precipitated calcium carbonate 50% in solid concentration was prepared with the calcium carbonate D as material. This slurry was passed through a wet-grinder at a rate of 500 ml/minute for preliminary wet-grinding. The slurry of the calcium carbonate was pulverized after drying by a spray dryer, and thus dry powder of the precipitated calcium carbonate D was obtained.

Figure 12:
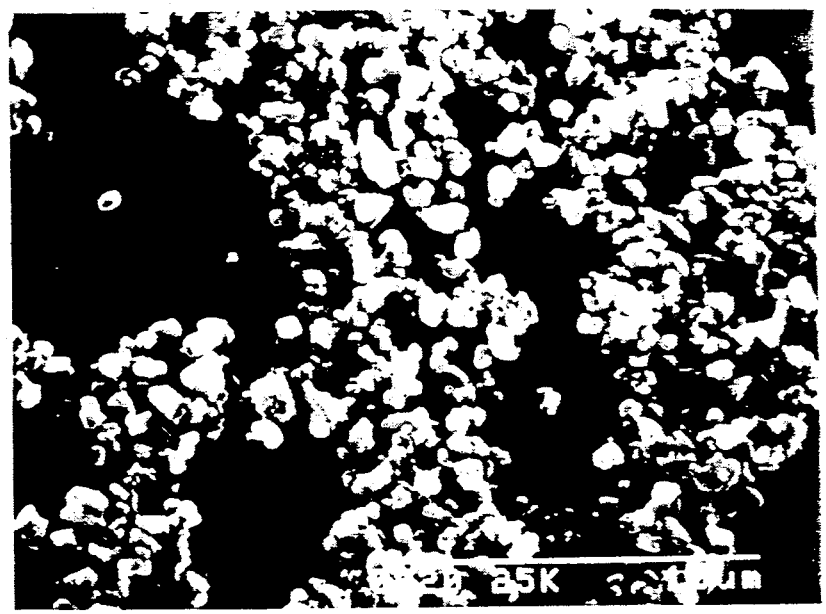

50 kg of the powder of the precipitated calcium carbonate D was poured into 50 kg of ethylene glycol under stirring to prepare an ethylene glycol slurry as wet-grinding material, this slurry was passed through a wet-grinder at a rate of 250 ml/minute for wet-grinding, and an ethylene glycol dispersion of the precipitated calcium carbonate D was prepared. The results of measurement of particle size distribution of this dispersion by the use of SA-CP-2, namely $d_2$, $S_2$, $D_2$ and $R_2$, are shown in Table 2. Also an electron microscopic picture ($\times 5,000$) of the dispersion is shown in FIG. 12.

CONTROL EXAMPLE 1

50 kg of ground calcium carbonate (Super-#2300, trade name, manufactured by Maruo Calcium Co., Ltd.) having 74300 cm$^2$/g in the specific surface area measured by the BET method and 0.3 μm in $D_1$ was poured into 50 kg of ethylene glycol under stirring to prepare an ethylene glycol slurry as wet-grinding material and the resulting slurry was passed through a wet-grinder, Dynomill at a rate of 30 ml/minute for wet-grinding to provide an ethylene glycol dispersion of the ground calcium carbonate. The results of measurement of particle size distribution of the dispersion by the use of SA-CP-2, namely $d_2$, $S_2$, $D_2$ and $R_2$, are shown in Table 2. An electron microscopic picture ($\times 10,000$) of the dispersion is also shown in FIG. 13.

Figure 13:

It was confirmed from Table 2 and FIG. 13 that the ethylene glycol dispersion of the ground calcium carbonate was broader in particle size distribution as compared with the ethylene glycol dispersion of precipitated calcium carbonate prepared in Example 1, despite the values of $d_2$ being almost the same, further containing coarse particles of 2 to 3 μm.

CONTROL EXAMPLE 2

An aqueous dispersion of the calcium carbonate E (solid concentration 16.8%) was dehydrated by the use of a filter press, the resulting press cake was pulverized after drying by a paddle dryer and 50 kg of dry powder of the precipitated calcium E was obtained. 50 kg of this precipitated calcium carbonate E was poured into 50 kg of ethylene glycol to prepare an ethylene glycol slurry for wet-grinding. This slurry was passed through a wet-grinder twice at a rate of 60 ml/minute, and an ethylene glycol dispersion of the precipitated calcium carbonate E was prepared. The results of measurement of particle size distribution of this dispersion by the use of SA-CP-2, namely $d_2$, $S_2$, $D_2$ and $R_2$, are shown in Table 2. An electron microscopic picture ($\times 5,000$) of the dispersion is shown in FIG. 15, another electron microscopic picture ($\times 2,000$) is shown in FIG. 16, and an electron microscopic picture ($\times 10,000$) of the precipitated calcium carbonate E as wet-grinding material (prior to wet-grinding) is shown in FIG. 14 respectively.

Figure 14:
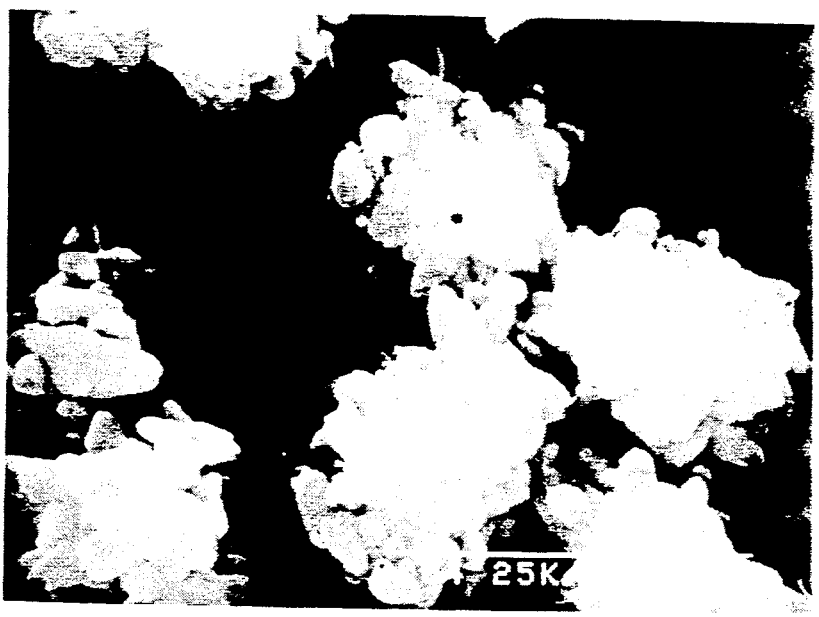
Figure 15:
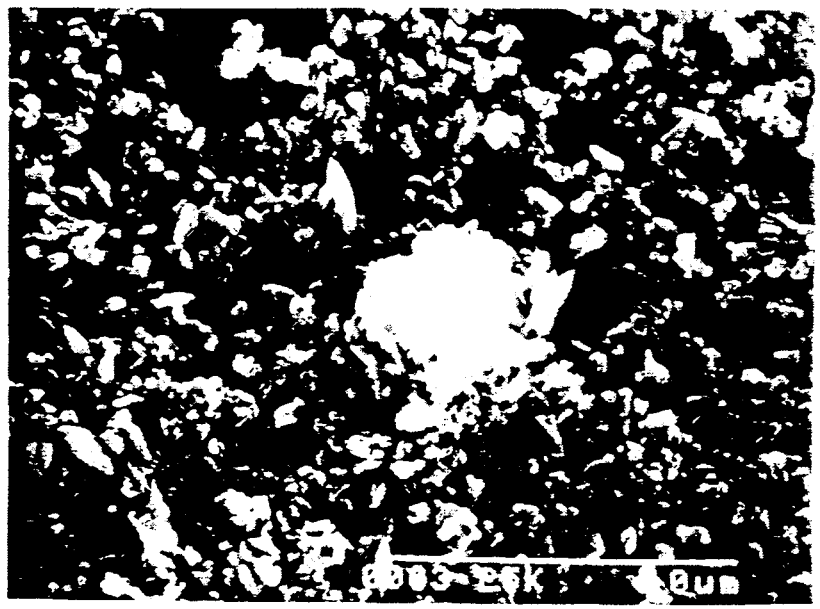
Figure 16:

From the results shown in Table 2 and FIGS. 14, 15 and 16, it is confirmed that the ethylene glycol dispersion of the precipitated calcium carbonate E, which was obtained by wet-grinding the precipitated calcium carbonate E with $R_1 > 7$ (See FIG. 1.), which means that cohesiveness between primary particles is extremely high and larger secondary particles are likely to be formed, had mixed therein coarse secondary particles approximately 5 μm in size, despite the fact that in the wet-grinding process for the ethylene glycol system 4 times as intensive grinding conditions as in Example 1 is adopted.

CONTROL EXAMPLE 3

Figure 17:
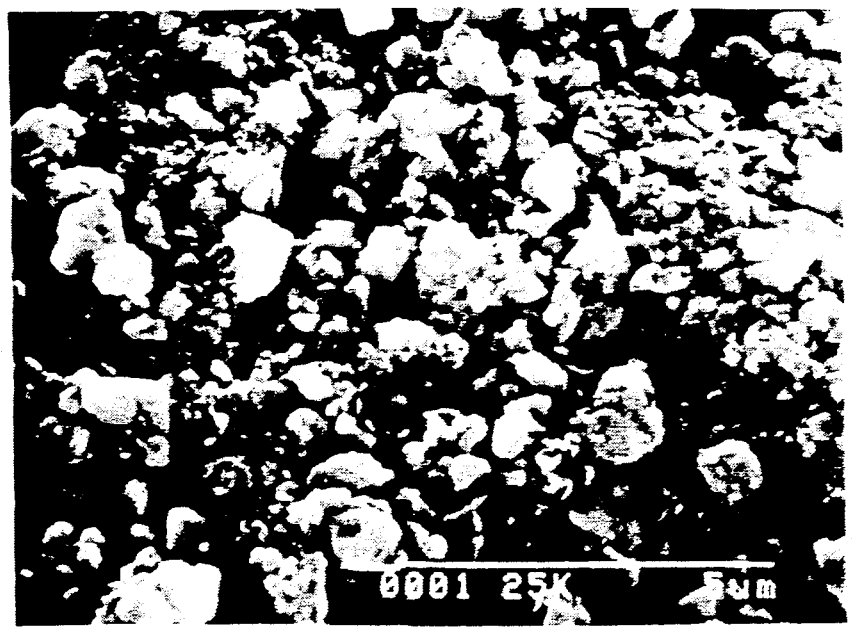

An ethylene glycol dispersion of the precipitated calcium carbonate C was prepared in the same manner as in Example 2, except that the ethylene glycol slurry as wet-grinding material was passed through the wet-grinder thrice at a rate of 60 ml/minute. The results of measurement of particle size distribution of the dispersion by the use of SA-CP-2, namely $d_2$, $S_2$, $D_2$ and $R_2$ are shown in Table 2. An electron microscopic picture ($\times 10,000$) of this dispersion is also shown in FIG. 17. FIG. 17 reveals that the ethylene glycol dispersion of the precipitated calcium carbonate prepared by Control example 3 contains unnecessary microfine particles in large amount, as compared with the dispersion of the precipitated calcium carbonate prepared by Example 2.

CONTROL EXAMPLE 4

50 kg of dry powder of the precipitated calcium carbonate D was poured into 50 kg of ethylene glycol and the obtained mixture was stirred vigorously for 10 minutes by the use of a dissolver type agitator having 10 cm-diameter blades and a peripheral speed of 62 m/minute to prepare an ethylene glycol dispersion of the precipitated calcium carbonate, instead of being wet-ground by the use of a wet-grinder. The results of measurement of particle size distribution of this dispersion by the use of SA-CP-2 are given in Table 2. Electron microscopic pictures of the dispersion were also shown in FIG. 18 ($\times 400$) and FIG. 19 ($\times 10,000$).

Figure 18:
Figure 19:
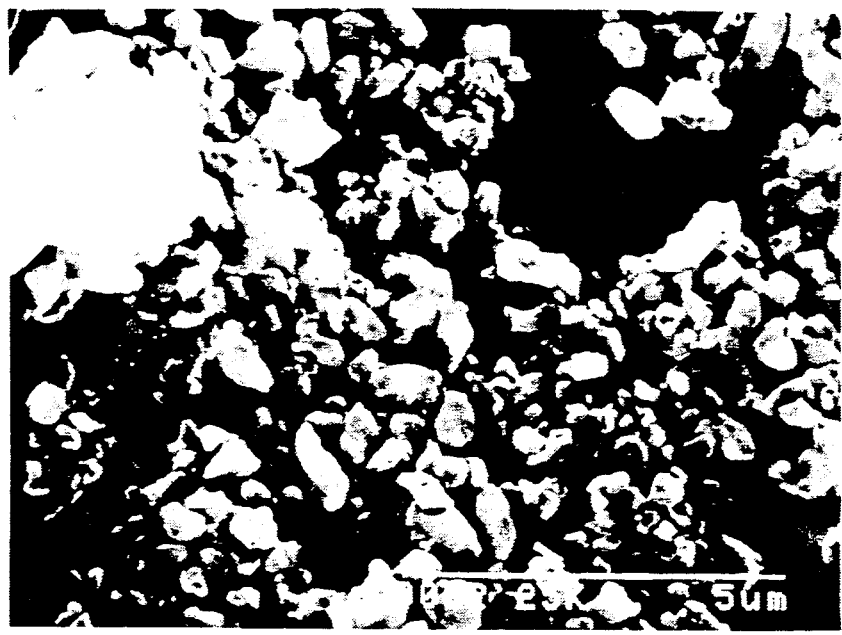

It was confirmed from FIGS. 18 and 19 that the ethylene glycol dispersion of the precipitated calcium carbonate D prepared by Control example 4 contained a large quantity of unnecessary coarse secondary particles ranging from 5 to 15 μm.

CONTROL EXAMPLE 5

A press cake obtained by dehydrating the precipitated calcium carbonate A (solid concentration: 14.9%) by the use of a filter press was pulverized after drying by a paddle dryer, and thus 30 kg of the precipitated calcium carbonate A was obtained.

30 kg of this calcium carbonate dry powder A was poured into 70 kg of ethylene glycol to prepare an ethylene glycol slurry as material to be wet-ground, this slurry was passed through a wet-grinder twice at a rate of 60 ml/min for wet-grinding and an ethylene glycol dispersion of the calcium carbonate A was thus prepared. The results of measurement of particle size distribution of this dispersion by the use of SA-CP-2, namely $d_2$, $S_2$, $D_2$ and $R_2$ are shown in Table 2. An electron microscopic picture ($\times 1,000$) of the dispersion is also shown in FIG. 20.

Figure 20:
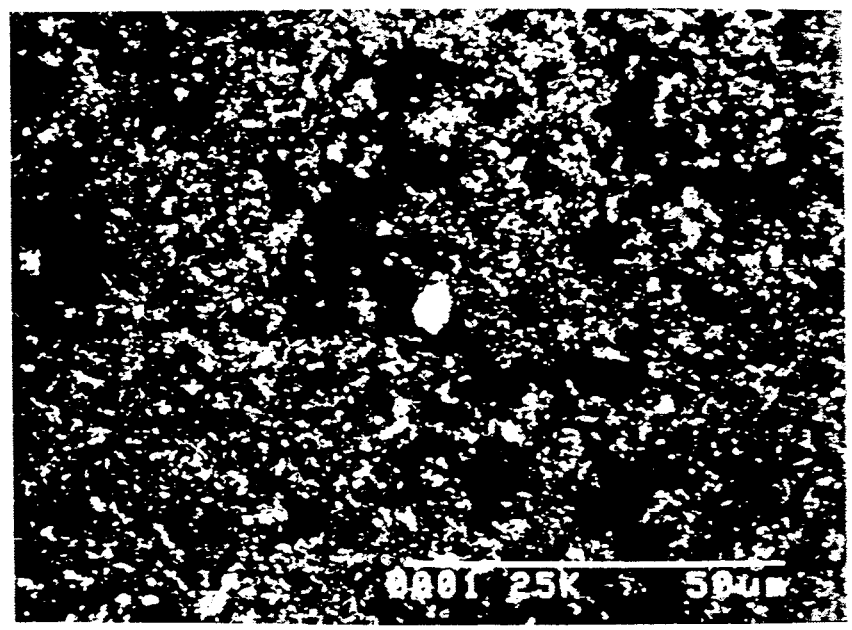

It was confirmed from FIG. 20 that in the ethylene glycol dispersion of the precipitated calcium carbonate A prepared in this Control example 5, a large quantity of secondary particles of 2 to 5 μm was contained.

tetrahydrate of manganese acetate as catalyst, and to this each of the ethylene glycol dispersions of calcium carbonate prepared in Example 1 and Control example 1 was added under stirring until the calcium carbonate concentration in the polymer reached 5,000 ppm. Then, polycondensation was carried out in a usual manner in vacuum at a high temperature and polyethylene terephthalate having the intrinsic viscosity of 0.63 was thus

TABLE 2

|  | Example | | | Control example | | | | |
| --- | --- | --- | --- | --- | --- | --- | --- | --- |
|  | 1 | 2 | 3 | 1 | 2 | 3 | 3 | 5 |
| Specific surface area $S_2$ by BET method ($cm^2/g$) | 78500 | 34600 | 124700 | 145000 | 118000 | 185000 | — | 410000 |
| $D_2$ calculated from $S_2$ (μm) | 0.28 | 0.64 | 0.18 | 0.15 | 0.18 | 0.12 | — | 0.054 |
| Cumulative particle size distribution (%) by SA-CP-2 (μm) | | | | | | | | |
| ~6 | 0.6 | 1.1 | 0.2 | 1.3 | 0 | 1.8 | — | 0.9 |
| 6~5 | 1.0 | 2.2 | 0.4 | 2.4 | 0.2 | 3.1 | — | 1.1 |
| 5~4 | 1.9 | 4.2 | 0.9 | 3.5 | 0.7 | 5.7 | — | 1.4 |
| 4~3 | 2.9 | 7.6 | 1.2 | 5.6 | 1.4 | 8.9 | — | 1.5 |
| 3~2 | 7.3 | 17.4 | 2.2 | 11.0 | 3.5 | 19.3 | — | 3.2 |
| 2~1 | 22.1 | 57.4 | 7.5 | 32.1 | 12.0 | 43.4 | — | 6.3 |
| 1~0.8 | 38.9 | 72.4 | 12.2 | 42.4 | 18.7 | 68.3 | — | 8.4 |
| 0.8~0.6 | 62.4 | 83.6 | 22.3 | 57.8 | 30.8 | 74.6 | — | 13.7 |
| 0.6~0.5 | 73.7 | 87.5 | 32.1 | 67.2 | 41.4 | 80.5 | — | 18.9 |
| 0.5~0.4 | 84.5 | 100.0 | 48.1 | 78.2 | 56.4 | 83.6 | — | 27.6 |
| 0.4~0.3 | 100.0 |  | 69.9 | 89.3 | 75.5 | 90.1 | — | 68.8 |
| 0.3~0.2 |  |  | 91.1 | 100.0 | 100.0 | 100.1 | — | 85.6 |
| 0.2~ |  |  | 100.0 |  |  |  | — | 100.0 |
| 50% average diameter of particle size distribution $d_2$ (μm) | 0.706 | 1.185 | 0.39 | 0.70 | 0.44 | 0.95 | — | 0.35 |
| $R_2 \left( = \dfrac{D_1}{D_2} \right)$ | 2.79 | 2.44 | 2.56 | 2.0 | 2.22 | 13.0 | — | 1.20 |

Filtrability of ethylene glycol dispersion:

400 ml each of 10 weight % dilute solid solutions of the ethylene glycol dispersions prepared in the Examples 1–3 and Control examples 1–5 was prepared by further dilution with ethylene glycol. Immediately after preparation and 24 hours thereafter, 200 ml of each 10 weight % dilute solid solution was filtrated under pressure of 2 kg/cm² through a 8 μm-thick membrane filter (manufactured by Milipore Inc.) and its passing amount was measured. The results are shown in Table 3.

TABLE 3

| Samples | Passing amount immediately after preparation (ml) | Passing amount 24 hours after preparation (ml) |
| --- | --- | --- |
| Example 1 | 200 | 200 |
| Example 2 | 200 | 200 |
| Example 3 | 200 | 200 |
| Cont. example 1 | 80 | 40 |
| Cont. example 2 | 140 | 100 |
| Cont. example 3 | 200 | 160 |
| Cont. example 4 | 40 | 10 |
| Cont. example 5 | 180 | 140 |

It is understood from Table 3 that the ethylene glycol dispersions prepared in each example is superior in filtrability, free from blockade of filter and excellent in dispersibility with the lapse of time.

Application example:

100 weight parts of dimethyl phthalate and 70 weight parts of ethylene glycol were subjected to ester exchange reaction in a usual manner with 0.035 parts of obtained. Each of these polymers was molten at 290° C. and then extruded, and after stretching 3.5 times longitudinally at 90° C. and 3.5 times laterally at 130° C., heat treatment was carried out at 220° C. and thus a film 15 μm thick was obtained.

Each of the obtained films is subjected to measurement according to ASTM-D-1894-63T.

The results of measurement of the films were 0.18 μm in the largest surface roughness for the film obtained by the use of the ethylene glycol dispersion prepared by Example 1 and 0.45 μm for the film obtained by the dispersion prepared by Control example 1.

As is apparent from the foregoing, the present invention is capable of providing calcium carbonate, uniform in particle size, free from unnecessary coarse or microfine particles, sharp in particle size distribution in glycol, freely selectable in particle size and stably dispersible in glycol, which improves running stability of audio tapes, video tapes, etc., contributing to improvement in properties such as sound and image.

What is claimed is:

1. A glycol dispersion consisting of precipitated calcium carbonate and glycol prepared by wet-grinding a glycol slurry composed of glycol and precipitated calcium carbonate meeting the requirements described below in (a) and (b) under the conditions described below in (c);

(a) the primary particle size $D_1$ calculated by the following formula (1) from the specific surface area $S_1$ measured by the BET method is not less than 0.1 μm:

$$Dx = 60,000/2.7Sx \quad (1)$$

wherein,

Dx: is the average particle size (μm) of precipitated calcium carbonate calculated from the specific surface area measured by the BET method; and Sx: is the specific surface area (cm²/g) of precipitated calcium carbonate measured by the BET method;

(b) the ratio $R_1$ of the 50% weight average particle size $d_1$ of particle size distribution measured in an aqueous medium by the use of Light Transmission Centrifugal Precipitation-Type Particle Size Distribution Measuring Device (manufactured by Shimazu Seisakusho Ltd.) to the aforesaid $D_1$ satisfies the following formula (2):

$$R_1 = d_1/D_1 \leq 7 \quad (2);$$

(c) the ratio $R_2$ of the aforesaid primary particle size $D_1$ to the primary particle size $D_2$ calculated by the aforesaid formula (1) from the specific surface area $S_2$ of wet-ground precipitated calcium carbonate measured by the BET method satisfies the following formula (3):

$$R_2 = D_1/D_2, \ 1 < R_2 \leq 10 \quad (3).$$

2. A glycol dispersion of claim 1, wherein the primary particle size $D_1$ is within a range of from 0.2 to 2 μm.

3. A glycol dispersion of claim 1 or 2, wherein the ratio $R_1$ is not more than 4.

* * * * *